US009635655B2

(12) United States Patent
Jha et al.

(10) Patent No.: US 9,635,655 B2
(45) Date of Patent: Apr. 25, 2017

(54) ENHANCEMENT TO THE BUFFER STATUS REPORT FOR COORDINATED UPLINK GRANT ALLOCATION IN DUAL CONNECTIVITY IN AN LTE NETWORK

(71) Applicant: INTEL CORPORATION, Santa Clara, CA (US)

(72) Inventors: Satish C. Jha, Hillsboro, OR (US); Rath Vannithamby, Portland, OR (US); Ali T. Koc, Portland, OR (US); Kathiravetpillai Sivanesan, Portland, OR (US); Mohammad Mamunur Rashid, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 87 days.

(21) Appl. No.: 14/582,384

(22) Filed: Dec. 24, 2014

(65) Prior Publication Data
US 2015/0245349 A1  Aug. 27, 2015

Related U.S. Application Data

(60) Provisional application No. 61/943,983, filed on Feb. 24, 2014.

(51) Int. Cl.
*H04W 72/04* (2009.01)
*H04W 28/02* (2009.01)

(52) U.S. Cl.
CPC ... *H04W 72/0413* (2013.01); *H04W 28/0205* (2013.01); *H04W 28/0278* (2013.01); *H04W 72/0486* (2013.01)

(58) Field of Classification Search
CPC ................................................ H04W 36/0005
See application file for complete search history.

(56) References Cited

U.S. PATENT DOCUMENTS

| 7,792,130 B2 * | 9/2010 | Fischer | G08C 17/02 370/310 |
| 2007/0127513 A1 * | 6/2007 | Sudini | H04L 12/5693 370/413 |

(Continued)

FOREIGN PATENT DOCUMENTS

| WO | WO 2009/104928 A1 | 8/2009 |
| WO | WO 2011/159102 A2 | 12/2011 |

OTHER PUBLICATIONS

3GPP; $3^{rd}$ Generation Partnership Project; Technical Specification Group Radio Access Network; Study on Small Cell enhancements for E-UTRA and E-UTRAN; Higher layer aspects; 3GPP TR 36.842 v12.0.0; Dec. 2013; 71 pages; Release 12.

(Continued)

*Primary Examiner* — Parth Patel
(74) *Attorney, Agent, or Firm* — Thorpe North & Western; Alex Haymond (57) ABSTRACT

Technology for efficiently splitting a bearer at the packet data convergence protocol (PDCP) layer for uplink (UL) data transfers in wireless networks where dual connectivity is available is disclosed. A user equipment (UE) can send buffer status reports (BSRs) to a master evolved node B (MeNB) and a secondary evolved node B (SeNB). The BSRs can be formatted such that the amount of data in a radio link control (RLC) buffer at the UE and the amount of data in a packet data convergence protocol (PDCP) buffer at the UE are contained in different fields. The BSRs can also contain redundancy indicator (RI) values specifying a redundancy level between the PDCP buffer amounts included in the BSRS. The MeNB and the SeNB may then coordinate, via an X2 interface, an amount of uplink (UL) resources to allocate to the UE.

23 Claims, 7 Drawing Sheets (56) References Cited

U.S. PATENT DOCUMENTS

| | | | |
|---|---|---|---|
| 2008/0069053 A1* | 3/2008 | Kim | H04W 36/02 370/332 |
| 2010/0087200 A1* | 4/2010 | Ishii | H04W 28/16 455/450 |
| 2011/0299476 A1 | 12/2011 | Fischer | |
| 2013/0058220 A1* | 3/2013 | Yi | H04W 72/1284 370/241 |
| 2013/0121171 A1* | 5/2013 | Wang | H04J 3/06 370/252 |
| 2014/0071948 A1* | 3/2014 | Kim | H04L 1/1841 370/331 |
| 2015/0098322 A1* | 4/2015 | Chen | H04W 72/0413 370/230 |
| 2015/0117241 A1* | 4/2015 | Koc | H04L 5/0032 370/252 |
| 2015/0117245 A1* | 4/2015 | Zhang | H04W 72/1284 370/252 |
| 2015/0181593 A1* | 6/2015 | Kim | H04W 52/0216 370/329 |
| 2015/0215987 A1* | 7/2015 | Kim | H04W 76/04 370/329 |
| 2015/0223093 A1* | 8/2015 | Zhang | H04W 24/10 370/252 |
| 2016/0044735 A1* | 2/2016 | Ohta | H04W 76/025 455/422.1 |

OTHER PUBLICATIONS

3GPP; $3^{rd}$ Generation Partnership Project; Technical Specification Group Radio Access Network; Scenarios and Requirements for Small Cell Enhancements for E-UTRA and E-UTRAN; 3GPP TR 36.932 v12.0.0; Dec. 2012; 14 pages; Release 12.

3GPP; $3^{rd}$ Generation Partnership Project; Technical Specification Group Radio Access Network; Evolved Universal Terrestrial Radio Access (E-UTRA); Radio Resources Control (RRC); Protocol specification; 3GPP TS 36.331 v11.5.0; Sep. 2013; 347 pages; Release 11.

Intel Corp, "BSR Transmission for Dual Connected UEs", 3GPP TSG-RAN2 R2-140281, Discussion/Decision, Feb. 2014, Meeting 85, Agenda 7.2.3, 3 pages, Prague, Czech Republic.

Nsn et al, "BSR and SR for Dual Connectivity", 3GPP TSG-RAN WG2 R2-140043, Discussion/Decision, Feb. 2014, Meeting 85, Agenda 7.2.3, 5 pages, Prague, Czech Republic.

* cited by examiner

ENHANCEMENT TO THE BUFFER STATUS REPORT FOR COORDINATED UPLINK GRANT ALLOCATION IN DUAL CONNECTIVITY IN AN LTE NETWORK

RELATED APPLICATIONS

The present application claims priority to U.S. Provisional Patent Application No. 61/943,983, filed Feb. 24, 2014, the entire specification of which is hereby incorporated by reference in its entirety for all purposes.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, a node can be a combination of an Evolved Universal Terrestrial Radio Access Network (E-UTRAN) Node B (also commonly called evolved Node Bs, enhanced Node Bs, eNodeBs, or eNBs) and a Radio Network Controllers (RNCs). Such a node can communicate with a wireless device, known as a user equipment (UE). A downlink (DL) transmission can be a communication from the node (e.g., eNodeB) to the wireless device (e.g., UE), and the uplink (UL) transmission can be a communication from the wireless device to the node.

In homogeneous networks, the node, also called a macro node, can provide basic wireless coverage to wireless devices in a cell. The cell can be the geographic region in which the wireless devices (UEs) are operable to communicate with the macro node. Heterogeneous networks (HetNets) can be used to handle the increased traffic loads on the macro nodes due to increased usage and functionality of wireless devices. HetNets can include a layer of planned high power macro nodes (or macro-eNBs) overlaid with layers of lower power nodes (small-eNBs, micro-eNBs, pico-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes," small nodes, or small cells.

In LTE, data can be transmitted from the eNodeB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Reference will now be made to the exemplary embodiments illustrated and specific language will be used herein to describe the same. It will nevertheless be understood that no limitation of the scope is thereby intended.

DETAILED DESCRIPTION

Before some embodiments are disclosed and described, it is to be understood that the claimed subject matter is not limited to the particular structures, process operations, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In 3GPP LTE Release 12.0, user equipments (UEs) may connect to more than one cell site simultaneously. For example, a UE may connect to a master evolved node B (MeNB) and at least one secondary evolved node B (SeNB) simultaneously. When the UE connects to two cells, the UE may receive data bearers from both cells at substantially the same time. The multiple bearers may be sent to the UE based on a location of an S1-U termination and location of the bearer split. In one example, the S1-U may be terminated at the MeNB and the bearer split may be performed at a packet data convergence protocol (PDCP) layer in the MeNB.

Figure 1A:
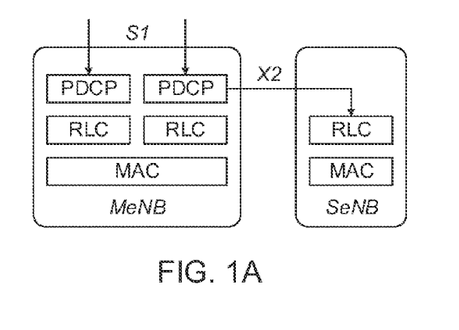
FIGS. 1A-1E illustrate dual connectivity architectures in accordance with an example.

FIG. 1A illustrates an example of a dual connectivity architecture for a master evolved node B (MeNB) and a secondary evolved node B (SeNB). The S1-U may be terminated at the MeNB and the bearer split may occur at the MeNB. In addition, independent radio link controls (RLCs) may be present in the MeNB and the SeNB for the split bearers. The MeNB may be connected to an Evolved Packet Core (EPC) via an S1 interface. For example, the MeNB may be connected to a serving gateway (S-GW) or mobility management entity (MME) via the S1 interface. The MeNB may include a PDCP layer, an RLC layer, and a media access channel (MAC) layer. The SeNB may include an RLC layer and a MAC layer. The MeNB may receive data and/or control information from higher layers at the PDCP layer (e.g., IP layer or application layer). In one example, the data or control information may be communicated from the PDCP layer in the MeNB to the RLC and MAC layers in the MeNB. In addition, the data or control information may be communicated from the PDCP layer in the MeNB to the RLC layer in the SeNB via an X2 interface.

Figure 1B:
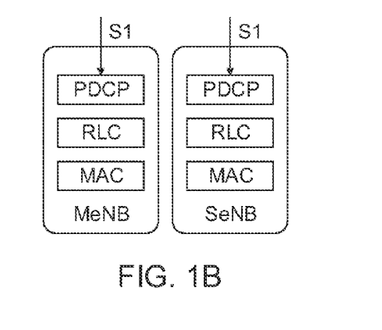

FIG. 1B illustrates another example of a dual connectivity architecture for a master evolved node B (MeNB) and a secondary evolved node B (SeNB). The S1-U may be terminated at the SeNB, and both the SeNB and the MeNB may include independent packet data convergence protocols (PDCPs), i.e., no bearer split. The MeNB and the SeNB may be connected to an Evolved Packet Core (EPC) via an S1 interface. For example, the MeNB and the SeNB may be connected to a serving gateway (S-GW) or mobility management entity (MME) via the S1 interface. The MeNB may include a PDCP layer, a radio link control (RLC) layer, and a media access channel (MAC) layer. In addition, the SeNB may include a separate PDCP layer, RLC layer, and MAC layer. The PDCP layer in the MeNB may receive data or control information from higher layers, and the PDCP layer in the SeNB may receive data or control information from higher layers.

Figure 1C:
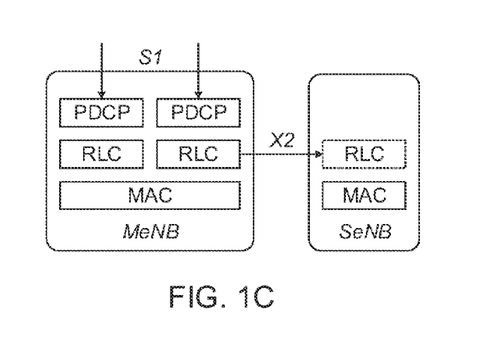

FIG. 1C illustrates yet another example of a dual connectivity architecture for a master evolved node B (MeNB) and a secondary evolved node B (SeNB). The S1-U may be terminated at the MeNB and the bearer split may occur at the MeNB. In addition, master-slave radio link controls (RLCs) may be present in the MeNB and the SeNB for the split bearers. The MeNB may be connected to an Evolved Packet Core (EPC) via an S1 interface. For example, the MeNB may be connected to a serving gateway (S-GW) or mobility management entity (MME) via the S1 interface. The MeNB may include a PDCP layer, an RLC layer, and a media access channel (MAC) layer. The SeNB may include an RLC layer and a MAC layer. The MeNB may receive data and/or control information from higher layers (e.g., IP layer or application layer) at the PDCP layer. In one example, the data or control information may be communicated from the PDCP layer in the MeNB to the RLC and MAC layers in the MeNB. In addition, the data or control information may be communicated, from the RLC layer in the MeNB, to the RLC layer in the SeNB via an X2 interface.

Figure 1D:
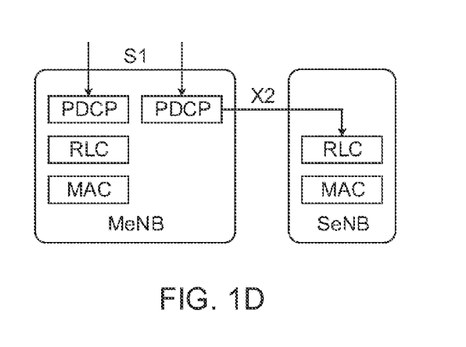

FIG. 1D illustrates yet another example of a dual connectivity architecture for a master evolved node B (MeNB) and a secondary evolved node B (SeNB). The S1-U may be terminated at the MeNB and no bearer split may occur at the MeNB. In addition, an independent radio link control (RLC) may be present at the SeNB. The MeNB may be connected to an Evolved Packet Core (EPC) via an S1 interface. For example, the MeNB may be connected to a serving gateway (S-GW) or mobility management entity (MME) via the S1 interface. The MeNB may include a PDCP layer, an RLC layer, and a media access channel (MAC) layer. The SeNB may include an RLC layer and a MAC layer. The MeNB may receive data and/or control information from higher layers at the PDCP layer. In one example, the data or control information may be communicated from the PDCP layer in the MeNB to the RLC and MAC layers in the MeNB. In addition, the data or control information may be communicated from the PDCP layer in the MeNB to the RLC layer in the SeNB via an X2 interface.

Figure 1E:
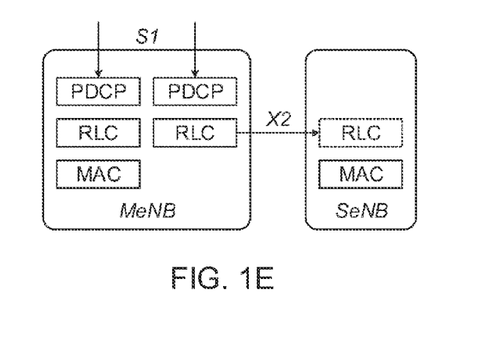

FIG. 1E illustrates yet another example of a dual connectivity architecture for a master evolved node B (MeNB) and a secondary evolved node B (SeNB). The S1-U may be terminated at the MeNB and no bearer split may occur at the MeNB. In addition, a master-slave radio link control (RLC) may be present for the SeNB bearers. The MeNB may be connected to an Evolved Packet Core (EPC) via an S1 interface. For example, the MeNB may be connected to a serving gateway (S-GW) or mobility management entity (MME) via the S1 interface. The MeNB may include a PDCP layer, an RLC layer, and a media access channel (MAC) layer. The SeNB may include an RLC layer and a MAC layer. The MeNB may receive data and/or control information from higher layers (e.g., IP layer or application layer) at the PDCP layer. In one example, the data or control information may be communicated from the PDCP layer in the MeNB to the RLC and MAC layers in the MeNB. In addition, the data or control information may be communicated from the RLC layer in the MeNB to the RLC layer in the SeNB via an X2 interface.

The dual connectivity architectures described in FIGS. 1A-1E are further discussed in 3GPP Technical Review (TR) 36.842 Version 12.0.0.

Figure 1F:
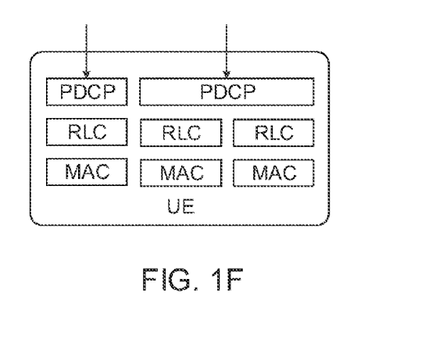
FIG. 1F illustrates an architecture of a user equipment (UE) operable to support dual connectivity in accordance with an example.

FIG. 1F illustrates exemplary architecture of a user equipment (UE). The UE may be configured to communicate with a master evolved node B (MeNB) and a secondary evolved node B (SeNB) in a dual connectivity architecture. The UE may include a PDCP layer, an RLC layer, and a MAC layer. The PDCP layer in the UE may receive data and/or control information from the MeNB. In addition, the PDCP layer in the UE may receive data and/or control information from the SeNB. In one example, the data or control information may be communicated from the PDCP layer in the UE to lower layers in the UE (e.g., the RLC and MAC layers).

In one configuration, the PDCP layer in the MeNB may receive packets (e.g., PDCP SDU packets or PDCP PDU packets) from higher layers in the downlink. The higher layers may include the IP layer or application layer in the MeNB. The PDCP layer may temporarily store the packets in a transmission buffer. In other words, the packets may be temporarily stored in the retransmission buffer until the packets are ready to be communicated (i.e., retransmitted) in downlink to the UE or the SeNB. For example, the packets in the retransmission buffer may be communicated from the MeNB to the UE via a MeNB radio link. As another example, the packets in the retransmission buffer may be communicated from the MeNB to the SeNB via a SeNB radio link.

While the 3GPP LTE advanced release 12 specifies that a bearer can be split at the PDCP layer for downlink (DL) data transfers, there is not yet a standard that addresses splitting a bearer at the packet data convergence protocol (PDCP) layer for uplink (UL) data transfers. FIGS. 2-6 describe approaches that allow a bearer at the PDCP layer for uplink (UL) data transfers from the UE to the MeNB and SeNB to be split efficiently.

When a UE has data for a radio bearer stored in a packet data convergence protocol (PDCP) buffer and/or RLC buffer that needs to be uploaded to an eNB, the UE will first request a grant of uplink resources from the eNB. This is generally accomplished by sending a type of media access control (MAC) control element (CE) called a buffer status report (BSR) to the eNB.

In the legacy BSR format, the RLC buffer size and the PDCP buffer size are combined into the same field. The eNB receives the BSR from the UE and allocates uplink resources (e.g., resource blocks on component carriers) to the UE as needed. However, it is not possible for the eNB to know how much of the request is allocated for data in the RLC buffer, and how much of the request is allocated for the data in the PDCP buffer.

In accordance with an embodiment, a BSR can include separate fields for the RLC buffer size and the PDCP buffer size. For example, a first field can include an indication of an amount of data in the PDCP buffer (i.e., a PDCP buffer size) for which uplink resources are requested from the eNB. In addition, a second field in the BSR can include an amount of data in the radio link control (RLC) buffer (i.e., an RLC buffer size) for which uplink resources are requested from the eNB. When a UE is connected to a in a dual connectivity architecture, to an MeNB and a SeNB at the same time, the UE can send two different BSRs; a first BSR is sent to the MeNB, while a second BSR is sent to the SeNB. The UE, in this type of dual-connection scenario, has a first RLC buffer that corresponds to the MeNB and a second RLC buffer, so the first RLC buffer is included in the first BSR and the second RLC buffer is included in the second BSR. However, there is only a single PDCP buffer.

As a result, if the UE requests uplink (UL) resources needed for the PDCP buffer data in both the first BSR and the second BSR, the UE may be making a redundant request (depending on the portions of the PDCP buffer size that are included in each respective BSR). If both the MeNB and the SeNB allocate uplink resources for the same PDCP buffer data, network inefficiency may result because the redundantly allocated UL resources could have been used by some other device.

One way to address this issue of redundant requests for uplink resources for PDCP data is for the MeNB and the SeNB to always assume that there is redundancy for which UL resources are requested between the first BSR and the second BSR. However, since the RLC buffer size and the PDCP buffer size are combined into the same field in the legacy BSR format, it would not be possible to ascertain what percentage of the total data for which UL resources are requested is RLC data as opposed to PDCP data. This is problematic because the RLC buffer size referenced in the first BSR and the RLC buffer size referenced in the second BSR refer to non-overlapping data. These non-redundant RLC buffer sizes are commingled in the same field with the redundant PDCP buffer sizes if the BSRs are in legacy BSR format. Hence, even if the MeNB and SeNB assume that some redundancy exists between the resource requests of the first and second BSRs, the eNBs cannot tell many of the resources requested in the BSRs are for needed for RLC data and how many are needed for PDCP data. As a result, the eNBs (the MeNB and the SeNB) may be forced to pessimistically allocate UL resources in order to ensure that sufficient resources are allocated for the non-redundant RLC buffer data.

In various embodiments, the current technology proposes new BSR formats in which the RLC buffer size and the PDCP buffer size are included in separate fields so that the MeNB and the SeNB can coordinate UL grants for UE PDCP data without encountering the difficulties caused by the RLC-and-PDCP commingling of the legacy BSR format. In addition, these new BSR formats can include a field with a redundancy indicator (RI) value that further enhance the abilities of the MeNB and the SeNB to coordinate UL grants for the UE.

Figure 2:
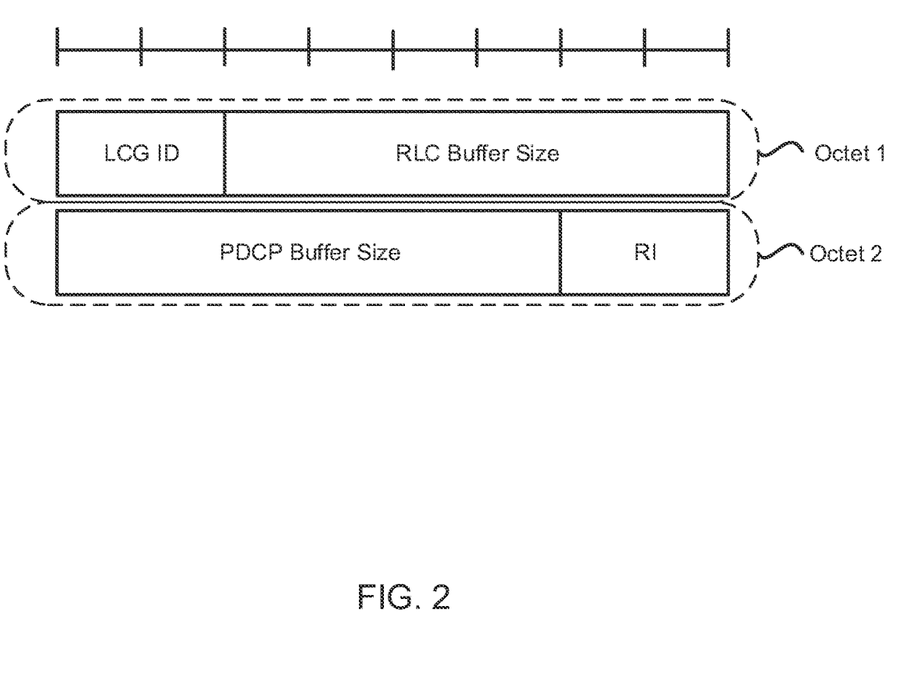
FIG. 2 depicts a format for a short buffer status report (BSR) in accordance with an example.

FIG. 2 illustrates an example of a new short BSR format for wireless networks in which dual connectivity is available. A short BSR is only large enough to communicate an amount of data for a single logical channel group (LCG), so a LCG identification (ID) is provided in the first two bits of octet 1 to specify the LCG to which the short BSR pertains. The remaining six bits of octet 1 specify an RLC buffer size (i.e., an amount of data in an RLC buffer at the UE). The first six bits of octet 2 specify the PDCP buffer size (i.e., an amount of data in a PDCP buffer at the UE). The remaining two bits in octet 2 specify a redundancy indicator (RI) value.

In one exemplary embodiment, a two-bit RI value of 00 can signify that UL resources for all UE PDCP buffer data are being requested from a single eNB (e.g., either the MeNB or the SeNB, but not both). For example, a two-bit RI value of 11 can signify that UL resources for 100% of the UE PDCP buffer data are being requested from both the MeNB and the SeNB (i.e., there is 100% redundancy regarding the requests for UE resources for PDCP buffer data). A two-bit RI value of 01 can signify that UL resources are being requested from both the MeNB and the SeNB for PDCP buffer data, but that there is no redundancy between the requests. A two-bit RI value of 01 can signify that UL resources are being requested from both the MeNB and the SeNB for PDCP buffer data and that there is partial redundancy between the requests. Other pairings of these two-bit values with the signified information are possible, of course, and can be arbitrarily assigned as desired. While examples have been provided for a two bit RI value, a plurality of bits can be used to communicate additional information regarding the redundancy information.

Figure 3:
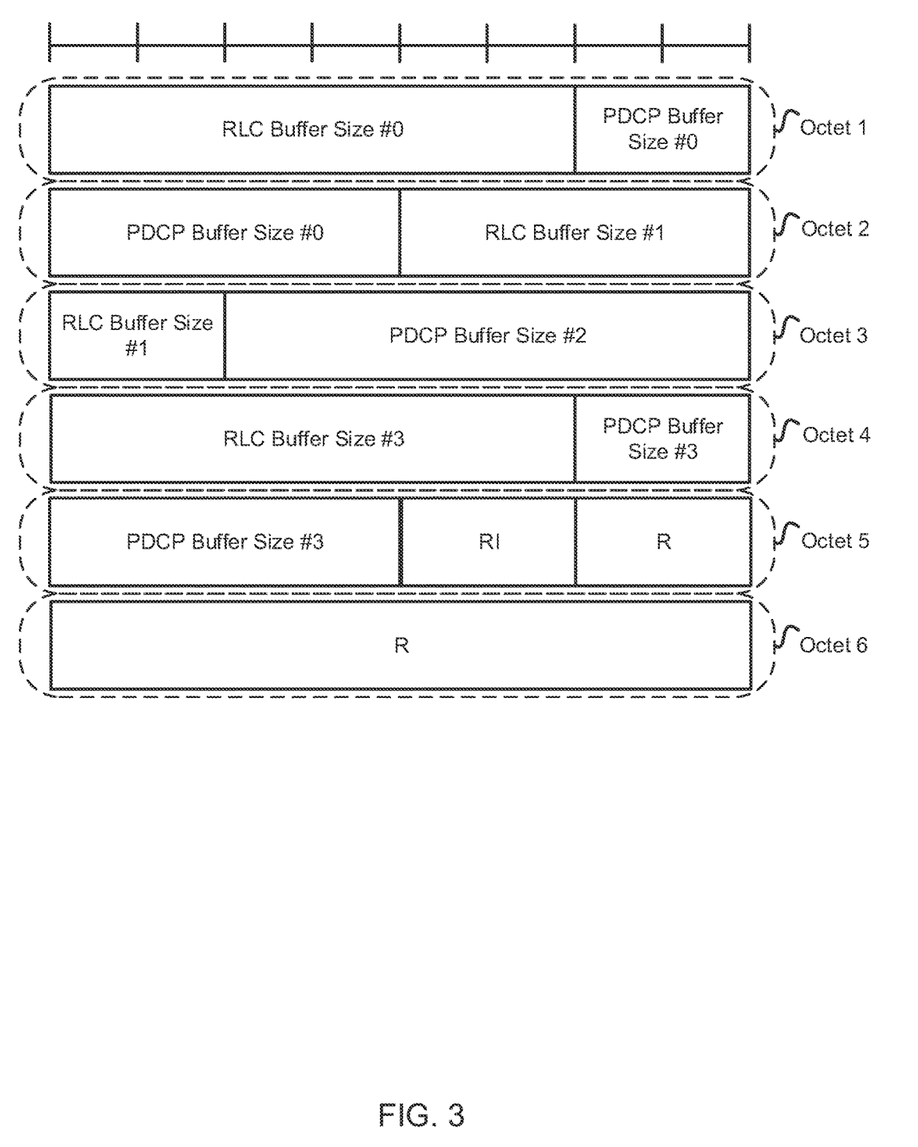
FIG. 3 depicts a format for a long buffer status report (BSR) in accordance with an example.

FIG. 3 illustrates an example of a new long BSR format for wireless networks in which dual connectivity is available. A long BSR is large enough to include data for all LCGs that are used in a 3GPP LTE wireless network, so no LCG ID is typically necessary. Instead, the first 6 bits of octet 1 can be used to specify an RLC buffer size for LCG 0. The last two bits of octet 1 and the first four bits of octet 2 can be used to specify a PDCP buffer size for LCG 0. The remaining four bits of octet 2 and the first two bits of octet 3 can be used to specify an RLC buffer size for LCG 1. The pattern continues for the other LCGs; six bits specify an RLC buffer size and six bits specify a PDCP buffer size, with bits carrying to the next octet as needed. The two bits that follow the PDCP buffer size for the last LCG are then used to specify a redundancy indicator (RI) value, as shown in the first two bits of octet 5. The RI values can be mapped to signified information as described. The reserved bits R can be used to indicate an amount of redundancy between PDCP buffer sizes sent to the MeNB and the SeNB, respectively, with greater specificity. For example, if the RI value of a BSR sent to the MeNB signifies that there is partial redundancy, the reserved bits R can specify the percentage of the PDCP buffer data for which UL resources are being redundantly requested from the SeNB. The information illustrated in the example of FIG. 3 is not intended to be limiting. Additional information can also be communicated in the BSR. Moreover, in some circumstances, fewer bits may be available and the BSR can be condensed to communicate less information, as in the short BSR.

Figure 4:
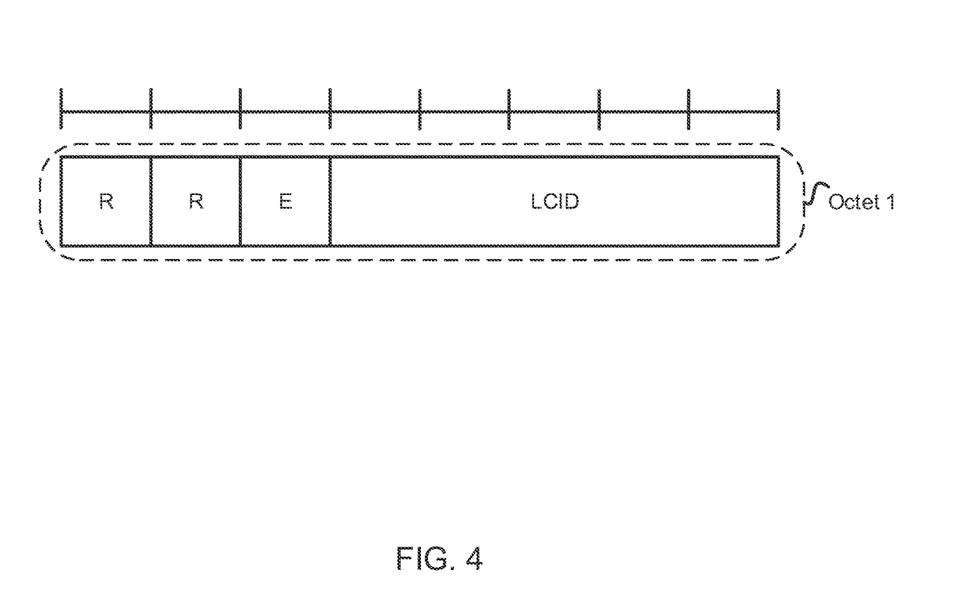
FIG. 4 depicts a format for a media access control (MAC) subheader in accordance with an example.

FIG. 4 illustrates an example of a MAC subheader that may be used to identify the short BSR format illustrated in FIG. 2 or the long BSR format illustrated in FIG. 3. A MAC subheader can include a logical channel identification (LCID), as shown. A first LCID can be selected from the reserved LCID pool (e.g., 01011-11000) to indicate that a BSR associated with the MAC subheader is in the format illustrated in FIG. 2. In addition, a second LCID can be selected from the reserved LCID pool to indicate that a BSR associated with the MAC subheader is in the format illustrated in FIG. 3.

Figure 5:
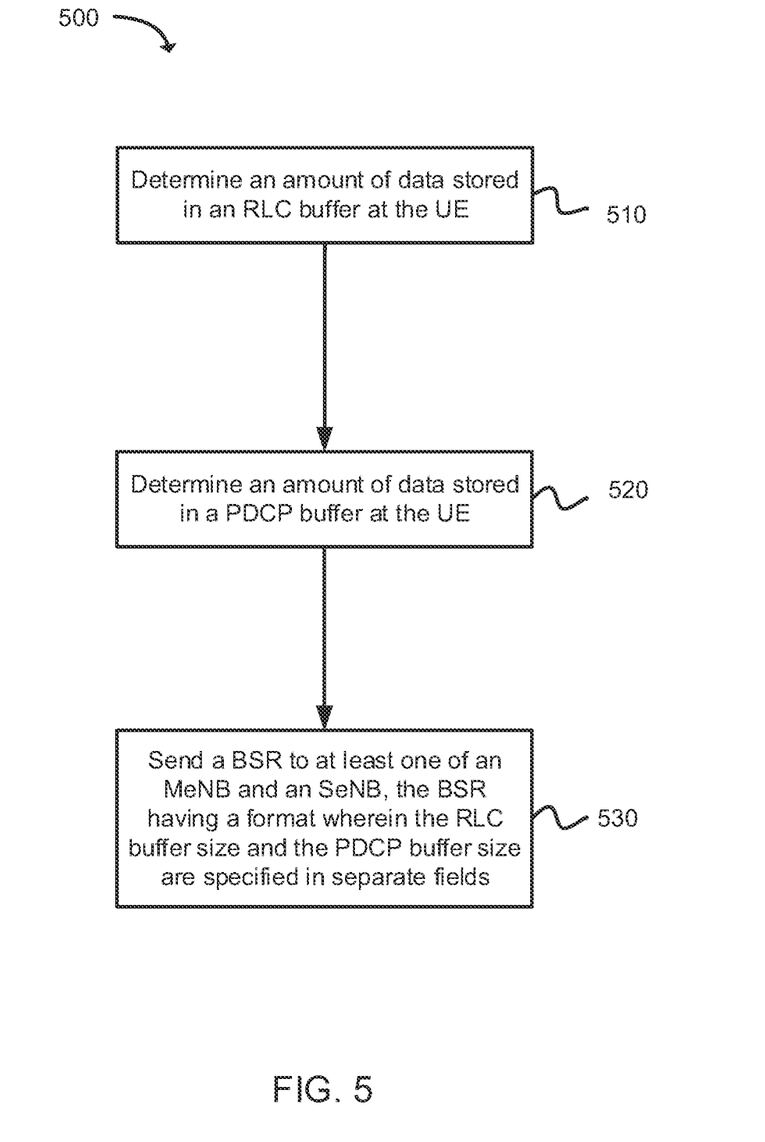
FIG. 5 is a flow chart illustrating a series of operations performed at a user equipment (UE) in accordance with an example.

FIG. 5 is a flow chart illustrating a set of operations 500 that may be executed at a UE in accordance with an example. As in 510, discrete circuitry and/or one or more digital processors at the UE can be configured to determine an amount of data stored in an RLC buffer at the UE. As in 520, circuitry and/or processors at the UE can also be configured to determine an amount of data stored in a PDCP buffer at the UE. As in 530, circuitry and/or processors at the UE can be configured to send a BSR to at least one of an MeNB and an SeNB, the BSR having a format wherein the RLC buffer size and the PDCP buffer size are specified in separate fields. The BSR can also include an RI value.

In another example, circuitry and/or processors at the UE can be configured to determine a first percentage of the amount of data in the PDCP buffer at the UE for which to request an uplink (UL) grant from the the MeNB and determine a second percentage of the amount of data in the PDCP buffer at the UE for which to request an uplink (UL) grant from the SeNB. The UE may then send a first buffer status report (BSR) communication from the UE to the MeNB and send a second buffer status report (BSR) communication from the UE to the SeNB. One or more of the first BSR communication and the second BSR communication can include the RLC buffer size and the first (or second) percentage of the amount of data in the PDCP buffer in separate fields.

In another example, circuitry and/or processors at the UE can be configured to select a redundancy indicator (RI) value that represents a redundancy relationship between the first percentage of the amount of data in the PDCP buffer and the second percentage of the amount of data in the PDCP buffer. This RI value can be included in one or more of the first BSR communication and the second BSR communication.

In another example, one or more of the first buffer status report (BSR) communication and the second buffer status report (BSR) communication can comprises a short BSR media access control (MAC) control element. The short BSR MAC control element can comprise a logical channel group (LCG) identification (ID), the RLC buffer size, at least one of the first percentage of the amount of data in the PDCP buffer and the second percentage of the amount of data in the PDCP buffer, and the RI value.

In another example, one or more of the first buffer status report (BSR) communication and the second buffer status report (BSR) communication can comprise a long BSR media access control (MAC) control element. The long BSR MAC control element can comprise four (4) radio link control (RLC) buffer sizes, each RLC buffer size pertaining to a different logical channel group (LCG); four (4) packet data convergence protocol (PDCP) buffer sizes, each PDCP buffer size pertaining to a different logical channel group (LCG); the RI value; and a plurality of bits indicating an amount of redundancy between the first percentage of the amount of data in the PDCP buffer and the second percentage of the amount of data in the PDCP buffer with greater specificity than the RI value.

In another example, circuitry and/or processors at the UE can be configured to send a MAC subheader along with one or more of the first buffer status report (BSR) communication and the second buffer status report (BSR) communication. The MAC subheader can include a logical channel identification (LCID) for an uplink shared channel (UL-SCH), wherein the LCID is used to identify the BSR MAC control element.

In another example, the RI value may be represented using two bits. In another example, an RI value of 00 can indicate that the PDCP buffer size is sent to only one of the MeNB or the SeNB; an RI value of 11 can indicate that there is complete redundancy between the first percentage of the amount of data in the PDCP buffer and the second percentage of the amount of data in the PDCP buffer; an RI value of 01 can indicate that there is no redundancy between the first percentage of the amount of data in the PDCP buffer and the second percentage of the amount of data in the PDCP buffer; and an RI value of 10 can indicate that there is partial redundancy between the first percentage of the amount of data in the PDCP buffer and the second percentage of the amount of data in the PDCP buffer.

Figure 6:
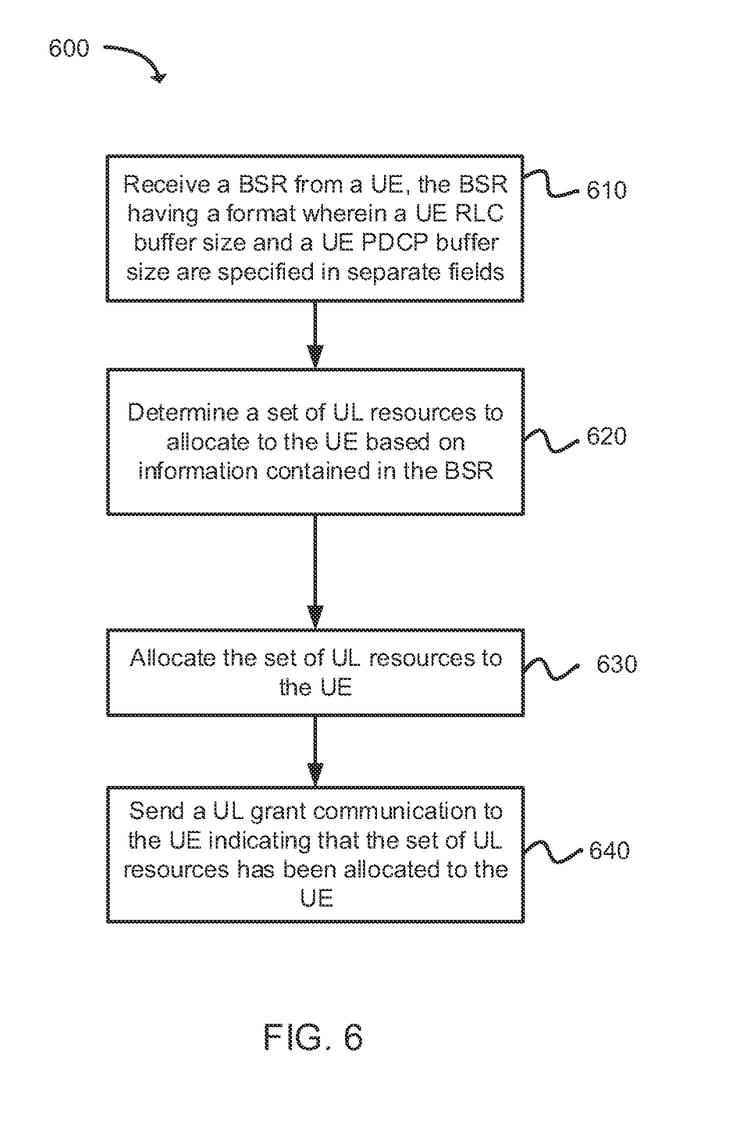
FIG. 6 is a flow chart illustrating a series of operations performed at a master evolved node B (MeNB) in accordance with an example.

FIG. 6 is a flow chart illustrating a set of operations 600 that may be executed at an MeNB (or an SeNB) in accordance with an example. As in 610, circuitry and/or processors at the MeNB may be configured to receive a BSR from a UE, the BSR having a format wherein a UE RLC buffer size and a UE PDCP buffer size are specified in separate fields. The BSR may also include an RI value or otherwise conform to any of the examples explained above. As in 620, the MeNB can determine a set of UL resources to allocate to the UE based on information contained in the BSR. The MeNB may also communicate with an SeNB via an X2 interface in order to coordinate the determination of set of UL resources to allocate to the UE. As in 630, the MeNB can then allocate the set of UL resources to the UE. As in 640, the MeNB can then send a UL grant communication to the UE indicating that the set of UL resources has been allocated to the UE.

Figure 7:
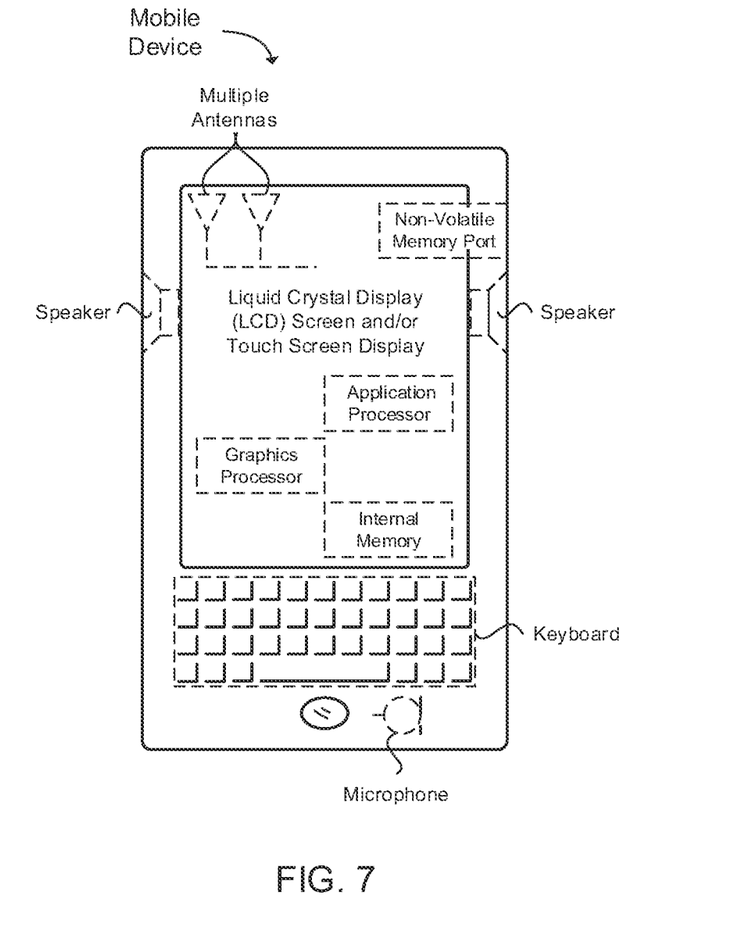
FIG. 7 illustrates a diagram of a wireless device (e.g., UE) in accordance with an example.

FIG. 7 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 7 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous.

Furthermore, the described features, structures, or characteristics may be combined in any suitable manner in one or more embodiments. In the following description, numerous specific details are provided, such as examples of layouts, distances, network examples, etc., to provide a thorough understanding of some embodiments. One skilled in the relevant art will recognize, however, that the claimed subject matter can be practiced without one or more of the specific details, or with other methods, components, layouts, etc. In other instances, well-known structures, materials, or operations are not shown or described in detail to avoid obscuring aspects of the claimed subject matter.

While the forgoing examples are illustrative of the principles of the claimed subject matter in one or more particular applications, it will be apparent to those of ordinary skill in the art that numerous modifications in form, usage and details of implementation can be made without the exercise of inventive faculty, and without departing from the principles and concepts of the claimed subject matter. Accordingly, it is not intended that the claimed subject matter be limited, except as by the claims set forth below.

What is claimed is:

1. A user equipment (UE) operable to communicate data to a master evolved node B (MeNB) and a secondary evolved node B (SeNB), the UE having one or more processors configured to:
   determine a radio link control (RLC) buffer size at the UE, the RLC buffer size comprising an amount of data stored in an RLC buffer at the UE;
   determine a packet data convergence protocol (PDCP) buffer size at the UE, the PDCP buffer size comprising an amount of data stored in an PDCP buffer at the UE;
   send a buffer status report (BSR) communication to at least one of the MeNB and the SeNB, the BSR communication including the RLC buffer size and at least part of the PDCP buffer size in separate fields;
   select a redundancy indicator (RI) value that represents a redundancy relationship between a first percentage of the amount of data in the PDCP buffer and a second percentage of the amount of data in the PDCP buffer; and include the RI value in one or more of a first BSR communication and a second BSR communication.

2. The UE of claim 1, wherein one or more of the first buffer status report (BSR) communication and the second buffer status report (BSR) communication further comprises a short BSR media access control (MAC) control element, the short BSR MAC control element comprising:
a logical channel group (LCG) identification (ID);
the RLC buffer size;
at least one of the first percentage of the amount of data in the PDCP buffer and the second percentage of the amount of data in the PDCP buffer; and
the RI value.

3. The UE of claim 2, the one or more processors being further configured to:
send a MAC subheader, the MAC subheader including a logical channel identification (LCID) for an uplink shared channel (UL-SCH), wherein the LCID is used to identify the short BSR MAC control element.

4. The UE of claim 1, wherein the RI value is represented using two bits.

5. The UE of claim 4, wherein:
an RI value of 00 indicates that the PDCP buffer size is sent to one of the MeNB or the SeNB;
an RI value of 11 indicates that there is complete redundancy between the first percentage of the amount of data in the PDCP buffer and the second percentage of the amount of data in the PDCP buffer;
an RI value of 01 indicates that there is no redundancy between the first percentage of the amount of data in the PDCP buffer and the second percentage of the amount of data in the PDCP buffer; and
an RI value of 10 indicates that there is partial redundancy between the first percentage of the amount of data in the PDCP buffer and the second percentage of the amount of data in the PDCP buffer.

6. The UE of claim 1, where at least one of the first buffer status report (BSR) communication and the second buffer status report (BSR) communication further comprises a long BSR media access control (MAC) control element, the long BSR MAC control element comprising:
four (4) radio link control (RLC) buffer sizes, each RLC buffer size pertaining to a different logical channel group (LCG);
four (4) packet data convergence protocol (PDCP) buffer sizes, each PDCP buffer size pertaining to a different logical channel group (LCG);
the RI value; and
a plurality of bits indicating an amount of redundancy between the first percentage of the amount of data in the PDCP buffer and the second percentage of the amount of data in the PDCP buffer with greater specificity than the RI value.

7. The UE of claim 6, the one or more processors being further configured to:
send a MAC subheader, the MAC subheader including a logical channel identification (LCID) for an uplink shared channel (UL-SCH), wherein the LCID is used to identify the long BSR MAC control element.

8. A master evolved node B (MeNB) operable to communicate data to a user equipment (UE), the MeNB having one or more processors configured to:
receive a buffer status report (BSR) communication from the UE, the BSR communication comprising a radio link control (RLC) buffer size, the RLC buffer size comprising an amount of data stored in an RLC buffer at the UE, and a packet data convergence protocol (PDCP) buffer size, the PDCP buffer size comprising an amount of data stored in an PDCP buffer at the UE, the RLC buffer size and the PDCP buffer size being included in separate fields;
determine a set of uplink (UL) radio resources to allocate to the UE based in part on the BSR communication from the UE;
allocate the set of uplink (UL) radio resources to the UE;
send an uplink (UL) grant communication to the UE indicating that the (UL) radio resources have been allocated to the UE; and
wherein the BSR communication from the UE further comprises a redundancy indicator (RI) value that represents a redundancy relationship between a first percentage of a UE PDCP buffer size and a second percentage of a UE PDCP buffer size.

9. The MeNB of claim 8, where the buffer status report (BSR) communication from the UE further comprises a short BSR media access control (MAC) control element, the short BSR MAC control element comprising:
a logical channel group (LCG) identification (ID);
the radio link control (RLC) buffer size;
the packet data convergence protocol (PDCP) buffer size; and
the RI value.

10. The MeNB of claim 8, the one or more processors being further configured to receive a MAC subheader, the MAC subheader including a logical channel identification (LCID) for an uplink shared channel (UL-SCH), wherein the LCID is used to identify the short BSR MAC control element.

11. The MeNB of claim 8, wherein the RI value is stored by two bits.

12. The MeNB of claim 11, wherein:
an RI value of 00 indicates that the PDCP buffer size is sent to one of the MeNB or an SeNB;
an RI value of 11 indicates that there is complete redundancy between a first percentage of the amount of data in the PDCP buffer and a second percentage of the amount of data in the PDCP buffer;
an RI value of 01 indicates that there is no redundancy between the first percentage of the amount of data in the PDCP buffer and the second percentage of the amount of data in the PDCP buffer; and
an RI value of 10 indicates that there is partial redundancy between the first percentage of the amount of data in the PDCP buffer and the second percentage of the amount of data in the PDCP buffer.

13. The MeNB of claim 8, where the buffer status report (BSR) communication from the UE further comprises a long BSR media access control (MAC) control element, the long BSR MAC control element comprising:
Four (4) radio link control (RLC) buffer sizes;
Four (4) packet data convergence protocol (PDCP) buffer sizes;
the RI value; and
a plurality of bits indicating the amount of redundancy between a first percentage of the PDCP buffer size and a second percentage of the PDCP buffer size with greater specificity than the RI value.

14. The MeNB of claim 13, the one or more processors being further configured to determine the set of uplink (UL) radio resources to allocate to the UE based in part on the plurality of bits indicating the amount of redundancy between the first percentage of the PDCP buffer size and the second percentage of the PDCP buffer size.

15. The MeNB of claim 13, the one or more processors being further configured to receive a MAC subheader, the MAC subheader including a logical channel identification (LCID) for an uplink shared channel (UL-SCH), wherein the LCID is used to identify the long BSR MAC control element.

16. The MeNB of claim 8, the one or more processors being further configured to communicate with a secondary evolved node B (SeNB) via an X2 interface in order to determine the set of uplink (UL) radio resources to allocate to the UE based in part on a coordination communication that is transferred between the MeNB and the SeNB via the X2 interface.

17. A non-transitory machine readable storage medium having instructions embodied thereon, the instructions which when executed by one or more processors perform the following operations:
   determining a radio link control (RLC) buffer size at a UE, the RLC buffer size comprising an amount of data stored in an RLC buffer at the UE;
   determining a packet data convergence protocol (PDCP) buffer size at the UE, the PDCP buffer size comprising an amount of data stored in an PDCP buffer at the UE;
   sending a buffer status report (BSR) communication to at least one of an MeNB and an SeNB, the BSR communication including the RLC buffer size and at least part of the PDCP buffer size in separate fields;
   selecting a redundancy indicator (RI) value that represents a redundancy relationship between a first percentage of the amount of data in the PDCP buffer and a second percentage of the amount of data in the PDCP buffer; and
   including the RI value in one or more of a first BSR communication and a second BSR communication.

18. The non-transitory machine readable storage medium of claim 17, wherein one or more of the first buffer status report (BSR) communication and the second buffer status report (BSR) communication further comprises a short BSR media access control (MAC) control element, the short BSR MAC control element comprising:
   a logical channel group (LCG) identification (ID);
   the RLC buffer size;
   at least one of the first percentage of the amount of data in the PDCP buffer and the second percentage of the amount of data in the PDCP buffer; and
   the RI value.

19. The non-transitory machine readable storage medium of claim 18, further having instructions thereon which when executed by one or more processors perform the following additional operations:
   sending a MAC subheader, the MAC subheader including a logical channel identification (LCID) for an uplink shared channel (UL-SCH), wherein the LCID is used to identify the short BSR MAC control element.

20. The non-transitory machine readable storage medium of claim 17, wherein the RI value is represented using two bits.

21. The non-transitory machine readable storage medium of claim 20, wherein:
   an RI value of 00 indicates that the PDCP buffer size is sent to one of the MeNB or the SeNB;
   an RI value of 11 indicates that there is complete redundancy between the first percentage of the amount of data in the PDCP buffer and the second percentage of the amount of data in the PDCP buffer;
   an RI value of 01 indicates that there is no redundancy between the first percentage of the amount of data in the PDCP buffer and the second percentage of the amount of data in the PDCP buffer; and
   an RI value of 10 indicates that there is partial redundancy between the first percentage of the amount of data in the PDCP buffer and the second percentage of the amount of data in the PDCP buffer.

22. The non-transitory machine readable storage medium of claim 17, where at least one of the first buffer status report (BSR) communication and the second buffer status report (BSR) communication further comprises a long BSR media access control (MAC) control element, the long BSR MAC control element comprising:
   four (4) radio link control (RLC) buffer sizes, each RLC buffer size pertaining to a different logical channel group (LCG);
   four (4) packet data convergence protocol (PDCP) buffer sizes, each PDCP buffer size pertaining to a different logical channel group (LCG);
   the RI value; and
   a plurality of bits indicating an amount of redundancy between the first percentage of the amount of data in the PDCP buffer and the second percentage of the amount of data in the PDCP buffer with greater specificity than the RI value.

23. The non-transitory machine readable storage medium of claim 22, further having instructions thereon which when executed by one or more processors perform the following additional operations:
   sending a MAC subheader, the MAC subheader including a logical channel identification (LCID) for an uplink shared channel (UL-SCH), wherein the LCID is used to identify the long BSR MAC control element.

* * * * *